(12) United States Patent
Kuebler

(10) Patent No.: US 10,538,420 B1
(45) Date of Patent: Jan. 21, 2020

(54) FORKLIFT-MOUNTED IMPLEMENT OR VEHICLE TOWING SYSTEM

(71) Applicant: CNH Industrial America LLC, New Holland, PA (US)

(72) Inventor: Marvin D. Kuebler, Goodfield, IL (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 16/184,591

(22) Filed: Nov. 8, 2018

(51) Int. Cl.
| | |
|---|---|
| *B66F 9/075* | (2006.01) |
| *B60D 1/52* | (2006.01) |
| *B60D 1/14* | (2006.01) |
| *B60D 1/28* | (2006.01) |
| *B60D 1/00* | (2006.01) |

(52) U.S. Cl.
CPC ............ *B66F 9/07504* (2013.01); *B60D 1/14* (2013.01); *B60D 1/28* (2013.01); *B60D 1/52* (2013.01); *B60D 2001/008* (2013.01)

(58) Field of Classification Search
CPC ....... B66F 9/07504; B60D 1/025; B60D 1/52; B60D 1/14; B60D 1/28; B60D 2001/008; B60D 1/02
See application file for complete search history.

(56) References Cited

U.S. PATENT DOCUMENTS

| | | | | |
|---|---|---|---|---|
| 1,419,398 | A * | 6/1922 | Mason ..................... | B60D 1/02 |
| | | | | 280/515 |
| 2,522,215 | A * | 9/1950 | Du Shane ................ | B60D 1/02 |
| | | | | 280/515 |
| 2,654,613 | A * | 10/1953 | Blair ........................ | B60D 1/02 |
| | | | | 280/490.1 |
| 2,697,618 | A * | 12/1954 | Hulstedt .................. | B60D 1/02 |
| | | | | 280/515 |
| 2,809,759 | A | 10/1957 | Manker | |
| 3,794,357 | A * | 2/1974 | Frye ......................... | B60D 1/02 |
| | | | | 280/507 |
| 4,065,013 | A | 12/1977 | Orthman | |

(Continued)

FOREIGN PATENT DOCUMENTS

| | | |
|---|---|---|
| EP | 1 134 180 A2 | 9/2001 |
| WO | 2004/050533 A1 | 6/2004 |

OTHER PUBLICATIONS

"Remote Hitch Pin Actuator", taken from: https://forsalebyinventor.com/products/portfolio-item/remote-hitch-pin-actuator/, Roger Hendricks, Jul. 25, 2017 (3 pages).

(Continued)

*Primary Examiner* — Mark C Hageman
(74) *Attorney, Agent, or Firm* — Rebecca L. Henkel; Rickard K. DeMille

(57) ABSTRACT

A system for interfacing with a hitch of an implement or a vehicle includes: a frame including at least one channel that is shaped to accept a tine of a forklift; a generally vertical spindle carried by the frame; an actuator carried by the frame; and a spindle engager pivotably coupled to the frame and linked to the actuator, the spindle engager defining an engaging position where the spindle engager engages the spindle and a non-engaging position where the spindle engager is out of engagement with the spindle. A forklift incorporating such a system and a method of hitching a forklift to an implement or a vehicle is also provided.

20 Claims, 8 Drawing Sheets

(56) References Cited

U.S. PATENT DOCUMENTS

| | | | |
|---|---|---|---|
| 4,266,795 A | | 5/1981 | Walker |
| 4,368,899 A | * | 1/1983 | Smalley .................. B60D 1/04 280/421 |
| 4,394,031 A | * | 7/1983 | Barton .................... B60D 1/02 172/677 |
| 4,552,377 A | * | 11/1985 | Folkerts ................ B60D 1/025 280/507 |
| 4,640,662 A | | 2/1987 | Spellman, Jr. |
| 5,772,230 A | * | 6/1998 | Kemnitz ................. B60D 1/02 280/479.1 |
| 6,047,982 A | * | 4/2000 | McClure ............. A01B 59/042 280/504 |
| 6,135,701 A | * | 10/2000 | Galloway, Sr. ........... B66F 9/18 280/415.1 |
| 6,390,489 B1 | | 5/2002 | Friesen |
| 7,004,488 B2 | * | 2/2006 | Reiter .................... B60D 1/02 280/477 |
| 7,063,169 B2 | | 6/2006 | Elliot |
| 7,891,693 B2 | * | 2/2011 | Olson ..................... B60D 1/00 280/416.1 |
| 8,505,691 B2 | | 8/2013 | Smeeton et al. |
| 8,616,576 B2 | * | 12/2013 | Olson ..................... B60D 1/02 280/416.2 |
| 8,770,612 B2 | | 7/2014 | Wendte et al. |
| 9,469,514 B1 | | 10/2016 | Hendricks |
| 9,499,379 B2 | | 11/2016 | Fox |
| 9,555,676 B2 | * | 1/2017 | Kringstad ............. B60D 1/025 |
| 10,214,401 B2 | * | 2/2019 | Brunckhorst ......... B62B 3/0612 |

OTHER PUBLICATIONS

"Forklift Tow and Hook Attachment Base", taken from: https://www.forkliftaccessories.com/forklift-tow-and-hook-attachment-base.html, Jul. 25, 2017 (2 pages).

* cited by examiner

FORKLIFT-MOUNTED IMPLEMENT OR VEHICLE TOWING SYSTEM

FIELD OF THE INVENTION

The present invention relates generally to forklifts and systems that can be incorporated on forklifts to hitch implements and other constructions to forklifts.

BACKGROUND OF THE INVENTION

Agricultural implements, such as tillage implements and planters, or vehicles, such as tractor trailers and automobiles, are difficult to move without utilizing a towing vehicle, such as a tractor. To link the implement to the towing vehicle for transport, a hitch assembly is often used.

One problem that may be encountered is transporting agricultural implements or vehicles when a tractor is unavailable. In such cases, utility vehicles (other than tractors) typically are not suited for interfacing with and transporting agricultural implements or other vehicles.

What is needed in the art is a way to transport implements, such as agricultural implements, or vehicles when a tractor is unavailable to interface with and transport the implement or vehicle.

SUMMARY OF THE INVENTION

Exemplary embodiments of the present disclosure provide a hitch interfacing system that may be mounted on a utility vehicle, such as a forklift, to interface with hitches of an implement, such as agricultural implements, or another vehicle to allow the towing utility vehicle to transport the interfaced implement or other vehicle.

In some embodiments formed in accordance with the present disclosure, a system for interfacing with a hitch of an implement or towed vehicle is provided. The system includes: a frame including at least one channel that is shaped to accept a tine of a forklift; a generally vertical spindle carried by the frame; an actuator carried by the frame; and a spindle engager pivotably coupled to the frame and linked to the actuator, the spindle engager defining an engaging position where the spindle engager engages the spindle and a non-engaging position where the spindle engager is out of engagement with the spindle.

In some embodiments formed in accordance with the present invention, a forklift for transporting hitched implements or vehicles is provided. The forklift includes: a chassis; at least one vertically displaceable tine carried by the chassis; and a hitch interfacing system. The hitch interfacing system includes: a frame comprising at least one channel with the at least one tine placed therein; a generally vertical spindle carried by the frame; an actuator carried by the frame; and a spindle engager pivotably coupled to the frame and linked to the actuator, the spindle engager defining an engaging position where the spindle engager engages the spindle and a non-engaging position where the spindle engager is out of engagement with the spindle.

In some embodiments disclosed herein, a method of hitching a forklift to an implement or a vehicle is provided. The method includes: aligning a generally vertical spindle carried by the forklift with a hitch opening of a hitch; vertically displacing at least one tine of the forklift to vertically displace the spindle such that a portion of the spindle is placed within the hitch opening; and pivoting a spindle engager from a non-engaging position to an engaging position where the spindle engager comes into engagement with the spindle to capture the hitch.

One advantage that may be realized by exemplary embodiments provided in accordance with the present disclosure is that forklifts, which are commonly available in a wide variety of facilities, may be used to transport agricultural implements or other vehicles including a hitch.

Another advantage that may be realized by exemplary embodiments provided in accordance with the present disclosure is that a tractor does not need to be used to transport agricultural implements or other vehicles including a hitch, allowing facility owners to forego purchasing and maintaining a tractor on-site for transporting agricultural implements and other vehicles.

BRIEF DESCRIPTION OF THE DRAWINGS

The above-mentioned and other features and advantages of this invention, and the manner of attaining them, will become more apparent and the invention will be better understood by reference to the following description of exemplary embodiments of the invention taken in conjunction with the accompanying drawings, wherein.

DETAILED DESCRIPTION OF THE INVENTION

Figure 1:
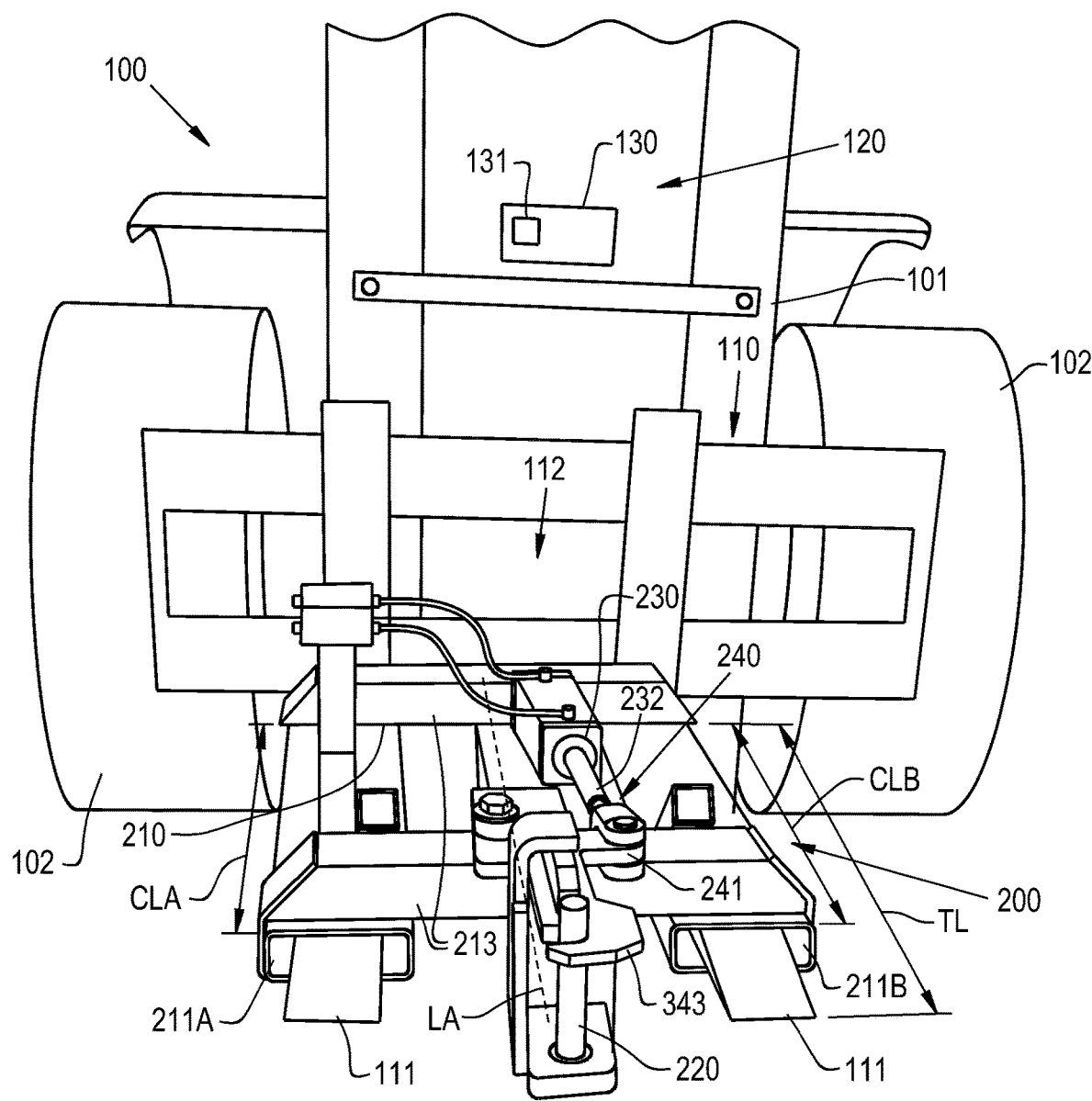
FIG. 1 is a front view of an exemplary embodiment of a forklift including a hitch interfacing system provided in accordance with the present disclosure.

The exemplary embodiments formed in accordance with the invention are described herein with reference to the appended figures. These figures are not necessarily to scale and their sizes and/or proportions may not correspond to reality, given that they aim at describing the exemplary embodiments in a didactic manner. Moreover, certain known and common constructive details may have been omitted for greater clarity and conciseness of the description which follows. The used reference numerals are repeated throughout the figures to identify identical or similar parts.

Referring now to the drawings, and more particularly to FIG. 1, an exemplary embodiment of a forklift 100 provided in accordance with the present disclosure is illustrated. The forklift 100 generally includes a chassis 101, a plurality of wheels 102 carried by the chassis 101, and a lift mechanism 110 including one or more tines 111, illustrated as two tines, that are vertically displaceable by a lift actuator 112 that is linked to the tines 111. The forklift 100 further includes an operator cab 120 from which an operator may operate the forklift 100. In some embodiments, the operator cab 120 includes a control panel 130 that includes a controller 131 that may control various functions of the forklift 100, as will be described further herein. Many different type of forklift constructions are known, so further description of known elements of the forklift 100 is omitted for brevity.

Figure 2:
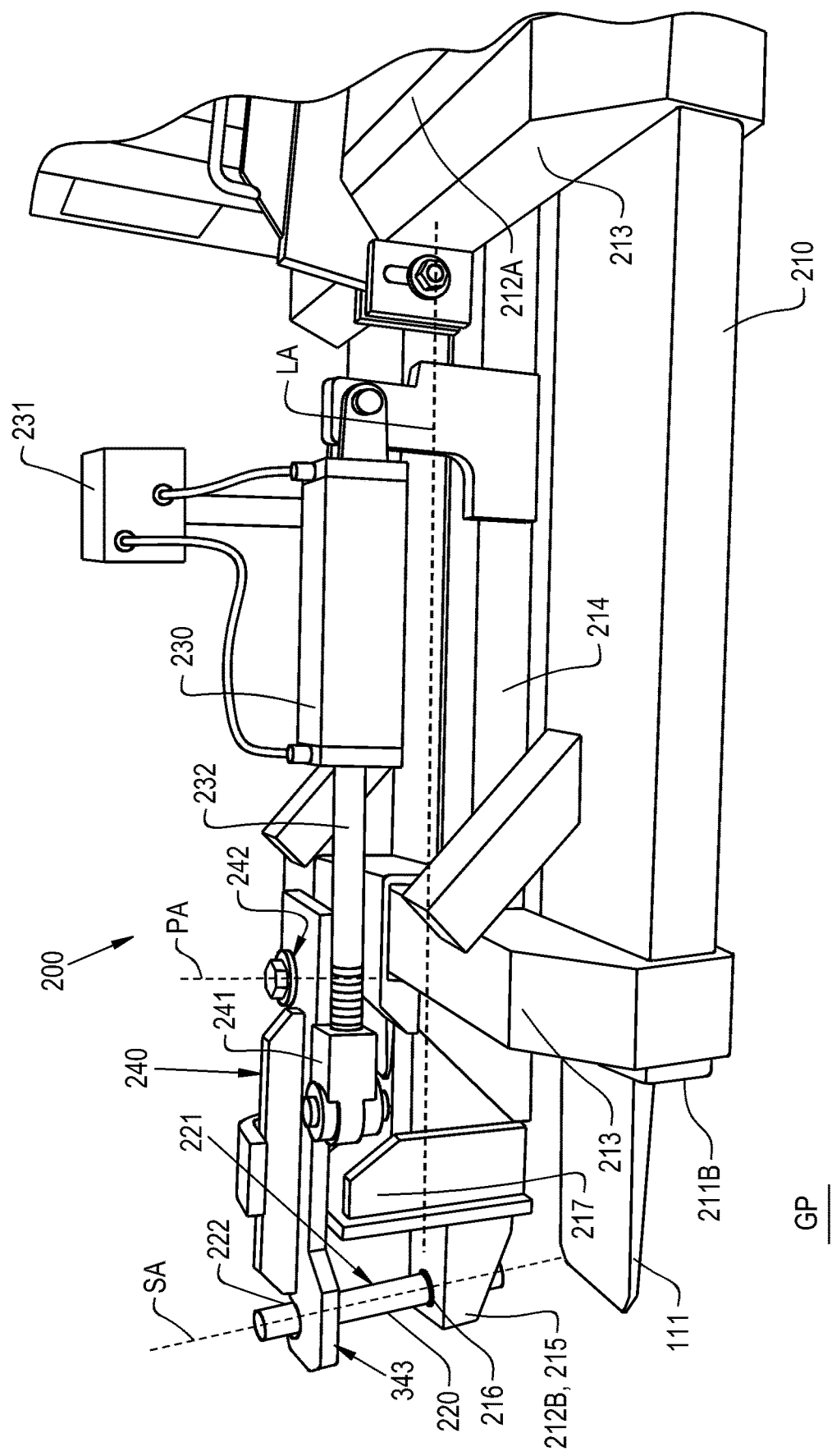
FIG. 2 is a side view of the hitch interfacing system illustrated in FIG. 1 with a spindle engager engaging a spindle of the hitch interfacing system.
Figure 3:
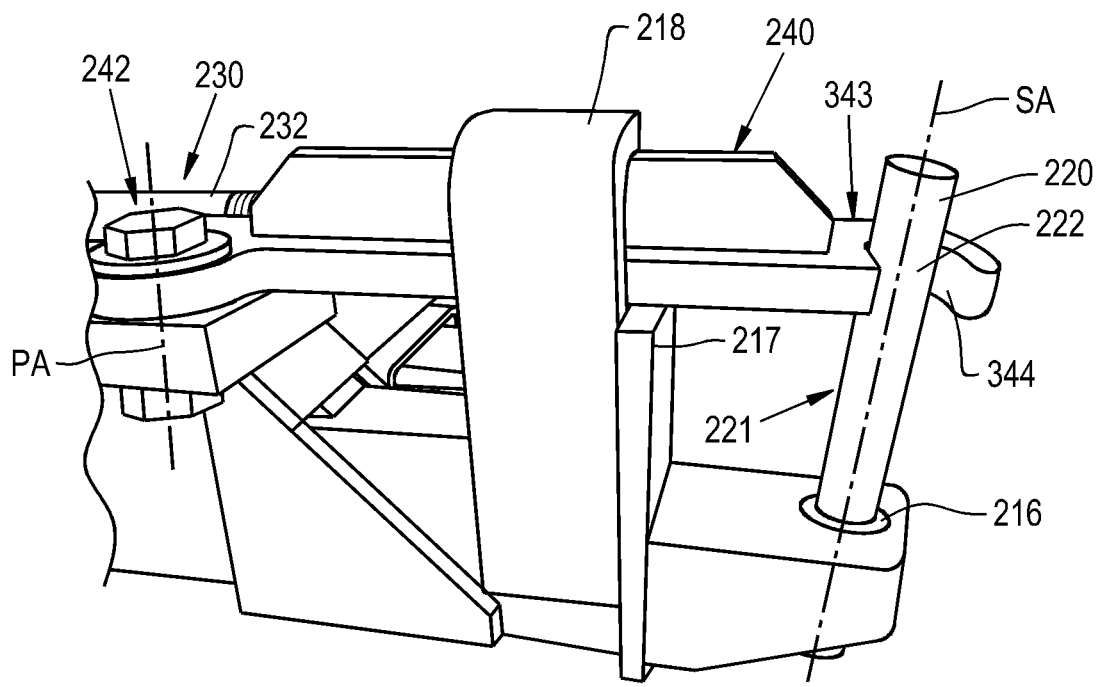
FIG. 3 is a close-up side view of the spindle engager and the spindle of the hitch interfacing system in engagement with one another.

With further reference to FIG. 1, and referring now to FIGS. 2-3, the forklift 100 carries a hitch interfacing system 200 for interfacing with a hitch of an implement. It should be appreciated that the system 200 may also be used to interface with a hitch of a vehicle, such as a tractor trailer or automobile, and is not restricted to use for towing only implements. The hitch interfacing system 200 generally includes a frame 210 that has at least one channel, illustrated as a pair of channels 211A, 211B, a generally vertical spindle 220 carried by the frame 210, an actuator 230 carried by the frame 210, and a spindle engager 240 pivotably coupled to the frame 210 and linked to the actuator 230.

To carry the hitch interfacing system 200, the tine(s) 111 of the forklift 100 are placed in the channel(s) 211A, 211B of the hitch interfacing system 200. In this sense, the channels 211A, 211B are shaped to accept the tines 111 of the forklift 100. In some embodiments, the hitch interfacing system 200 is configured to be carried by a vehicle other than a forklift and may forego, for example, the channels 211A, 211B. The channels 211A, 211B of the frame 210 may be formed as elongated channels that each define a respective length CLA, CLB extending parallel to a longitudinal axis LA defined by the frame 210 and extending through a pair of opposite longitudinal ends 212A, 212B of the frame 210. The lengths CLA, CLB of the channels 211A, 211B may be less than a tine length TL of the tines 111 so the tines 111 fully extend through the channels 211A, 211B to mount the system 200 to the forklift 100. As illustrated, one of the longitudinal ends 212A may be held adjacent to the forklift 100 when the system 200 is carried by the forklift 100. In some embodiments, the frame 210 includes one or more crossbars 213 to, for example, connect the channels 211A, 211B together and provide structural integrity to the frame 210.

The generally vertical spindle 220 is carried by the frame 210 to interface with openings of a hitch, as will be described further herein. As used herein, the spindle 220 is "generally vertical" in the sense that the spindle 220 defines a spindle axis SA that extends generally perpendicular, i.e., forming an angle between 85° and 90°, relative to a ground plane GP when carried by the forklift 100. As illustrated, the spindle 220 may have a generally cylindrical shape and be carried at the longitudinal end 212B of the frame 210, which is opposite the longitudinal end 212A that may be adjacent to the forklift 100 when the system 200 is carried by the tines 111. In some embodiments, the spindle 220 is adjustable and may be, for example, pivotable. The spindle 220 may be carried on a center bar 214 of the frame 210 that extends generally parallel to the longitudinal axis LA in between the channels 211A, 211B, with the spindle 220 carried at a cantilevered end 215 of the center bar 214, which also defines the longitudinal end 212B of the frame 210. When mounted to the forklift 100, the spindle 220 may extend longitudinally past ends of the tines 111 to conveniently interface with a hitch, as will be described further herein. In some embodiments, the spindle 220 extends from a base 216 that extends generally parallel to the longitudinal axis LA and has a vertically extending stop 217, which will be described further herein. It should be appreciated that the shape and size of the spindle 220 may be adjusted to interact with different hitch configurations.

The actuator 230 carried by the frame 210 may be connected to the center bar 214. In some embodiments, the actuator 230 is a hydraulic actuator that is supplied with hydraulic fluid pressure from a hydraulic circuit of the forklift 100, such as an auxiliary hydraulic line, via a hydraulic fluid block 231. Alternatively, the actuator 230 may be a pneumatic or electrical actuator that derives its power from a power source carried by the frame 210 or from one or more systems of the forklift 100. When the actuator 230 derives its power from a system of the forklift 100, the forklift operator may control function of the actuator 230 while operating the forklift 100. For example, the controller 131 of the control panel 130 in the operator cab 120 may be operatively coupled to the actuator 230 to control the function of the actuator 230. The operator may, for example, utilize the controller 131 to control fluid flow to the actuator 230 and linearly translate an actuator rod 232 of the actuator 230 to pivot the spindle engager 240, as will be described further herein. It should be appreciated that, alternatively, the controller 131 may be utilized to control the supply of electrical or pneumatic power to the actuator 230 when the actuator is an electrical actuator or pneumatic actuator, respectively. Thus, in some embodiments the actuator 230 can be controlled by an operator from the operator cab 120 to capture a hitch, as will be described further herein.

The spindle engager 240 is pivotably coupled to the frame 210, such as the center bar 214, and linked to the actuator 230. As illustrated in FIGS. 1-3, the spindle engager 240 is in an engaging position where the spindle engager 240 engages, i.e., contacts, the spindle 220 to form a capture region 221 of the spindle 220 between an engagement region 222 of the spindle 220, where the spindle engager 240 engages the spindle 220, and the base 216. In some embodiments, the spindle engager 240 includes an arm 241 that connects to the actuator rod 232 so linear translation of the actuator rod 232 causes pivoting of the spindle engager 240 about a pivot axis PA defined at a pivotable connection 242 between the spindle engager 240 and the frame 210, which may be a pivot bolt 242. Alternatively, the actuator 230 may be a rotary actuator that directly imparts rotational motion to the spindle engager 240 to pivot the spindle engager 240 about the pivot axis PA and thus does not require a linear-to-rotational motion converter.

The spindle engager 240 may include a hook 343 having an engagement groove 344 formed therein that is circumferentially aligned with the spindle 220 about the pivot axis PA of the spindle engager 240, which also represents the pivot axis PA of the hook 343, such that pivoting of the hook 343 can engage or disengage the spindle 220 with the engagement groove 344, as will be described further herein.

In this sense, pivoting of the hook 343 and the engagement groove 344 is generally constrained in a horizontal plane defined perpendicularly to the pivot axis PA to engage and disengage the spindle 220. To encourage smooth engagement between the spindle engager 240 and the spindle 220, the pivot axis PA may extend generally parallel with the spindle axis SA, i.e., form no more than a 5° angle, so the horizontal movement plane of the hook 343 is also perpendicular to the spindle axis SA. A pivot stop portion 218, which may have a partially curved shape, of the stop 217 may extend into the pivot path of the spindle engager 240 to prevent over-pivoting of the spindle engager 240 by interfering with pivoting of the spindle engager 240 past the pivot stop portion 218.

Figure 4:
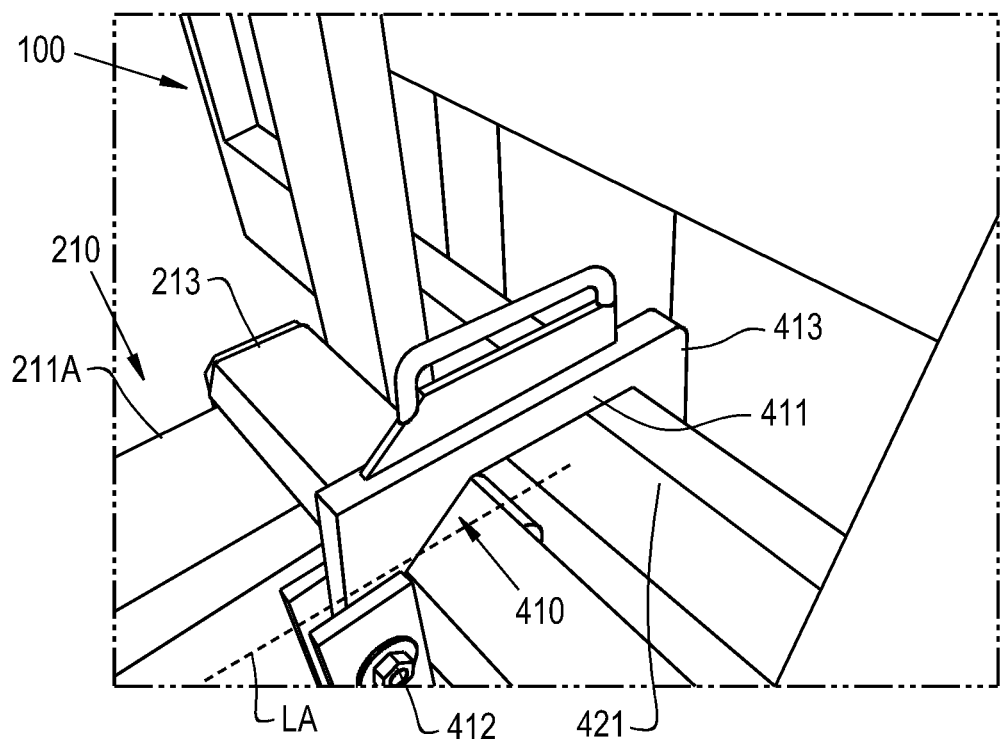
FIG. 4 is a perspective view of a lock of the hitch interfacing system illustrated in FIGS. 1 and 2 fastening the hitch interfacing system to the forklift.

Referring now to FIG. 4, a lock 410 that may be included with the hitch interfacing system 200 to fasten the system 200 to the forklift 100 is illustrated. The lock 410 may include a locking hook 411 that is pivotably coupled to the center bar 214 at a pivot bolt 412 so a hooked end 413 may be raised and lowered into and out of engagement with a frame bar 421 of the forklift 100. The hooked end 413 of the locking hook 411 grasps the frame bar 421 of the forklift 100 such that the lock 410, and thus the entire hitch interfacing system 200, is fastened to the forklift 100 and restricted from being pulled off the tines 111 in a direction of the longitudinal axis LA while the forklift 100 tows a hitched implement. It should be appreciated that the configuration of the lock 410 represents only one suitable way of fastening the hitch interfacing system 200 to the forklift 100 to prevent the system 200 from being pulled off the tines 111 while towing a hitched implement.

Figure 5:
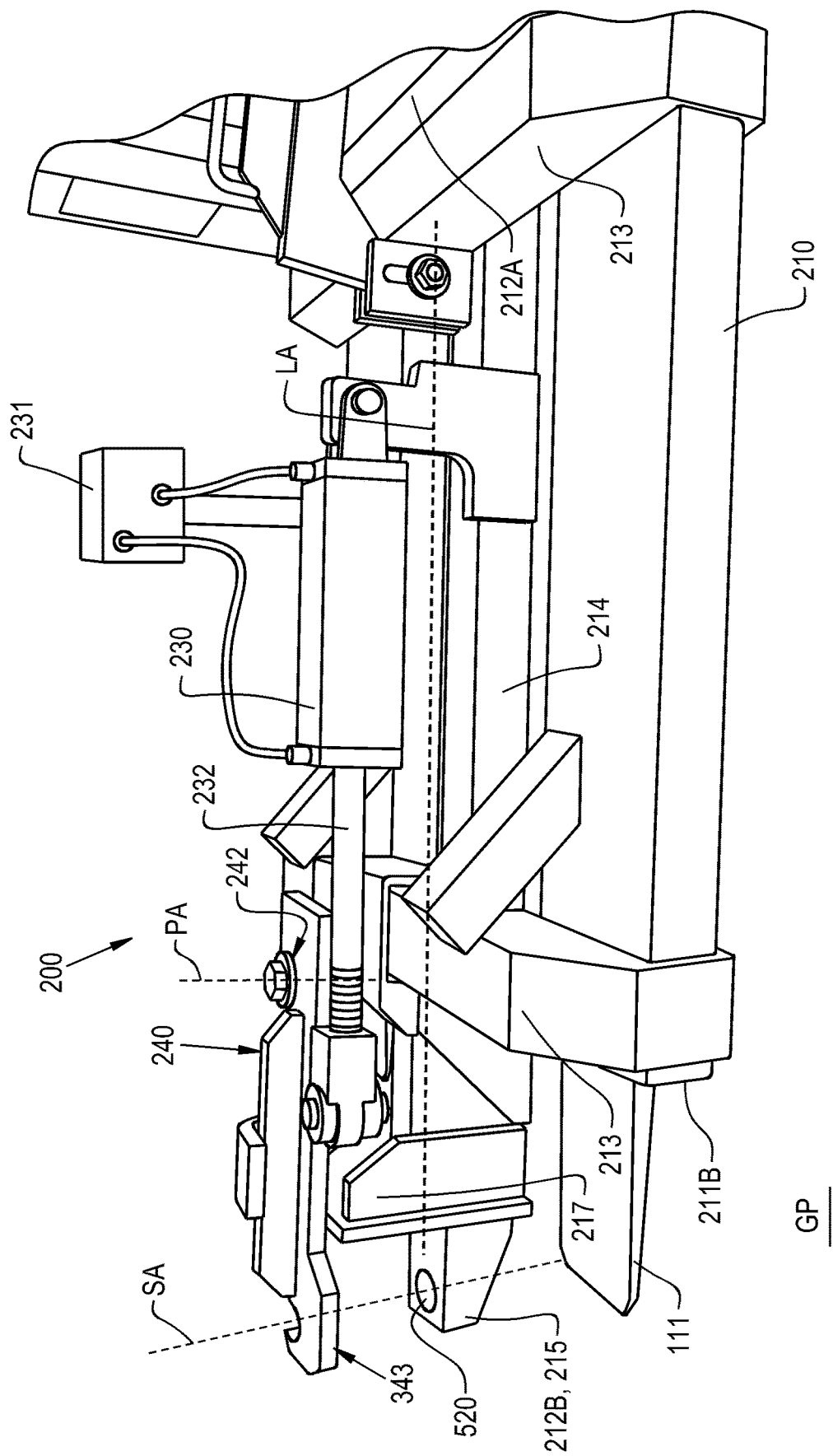
FIG. 5 is a perspective view of an alternative embodiment of the hitch interfacing system illustrated in FIGS. 1-4 with a spindle opening provided in place of a spindle.

Referring now to FIG. 5, an alternative embodiment of a hitch interfacing system 500 is illustrated that is substantially similar to the hitch interfacing system 200, but includes a spindle opening 520 in place of the spindle 220. The spindle opening 520 may be sized and shaped to surround a spindle of an implement, as will be described further herein. In other respects, the spindle opening 520 may be placed on the frame 210 similarly to the spindle 220 and the hitch interfacing system 500 illustrated in FIG. 5 may be formed similarly to the hitch interfacing system 200 illustrated in FIG. 2, so further description of the components of the system 500 is omitted for brevity.

Figure 6:
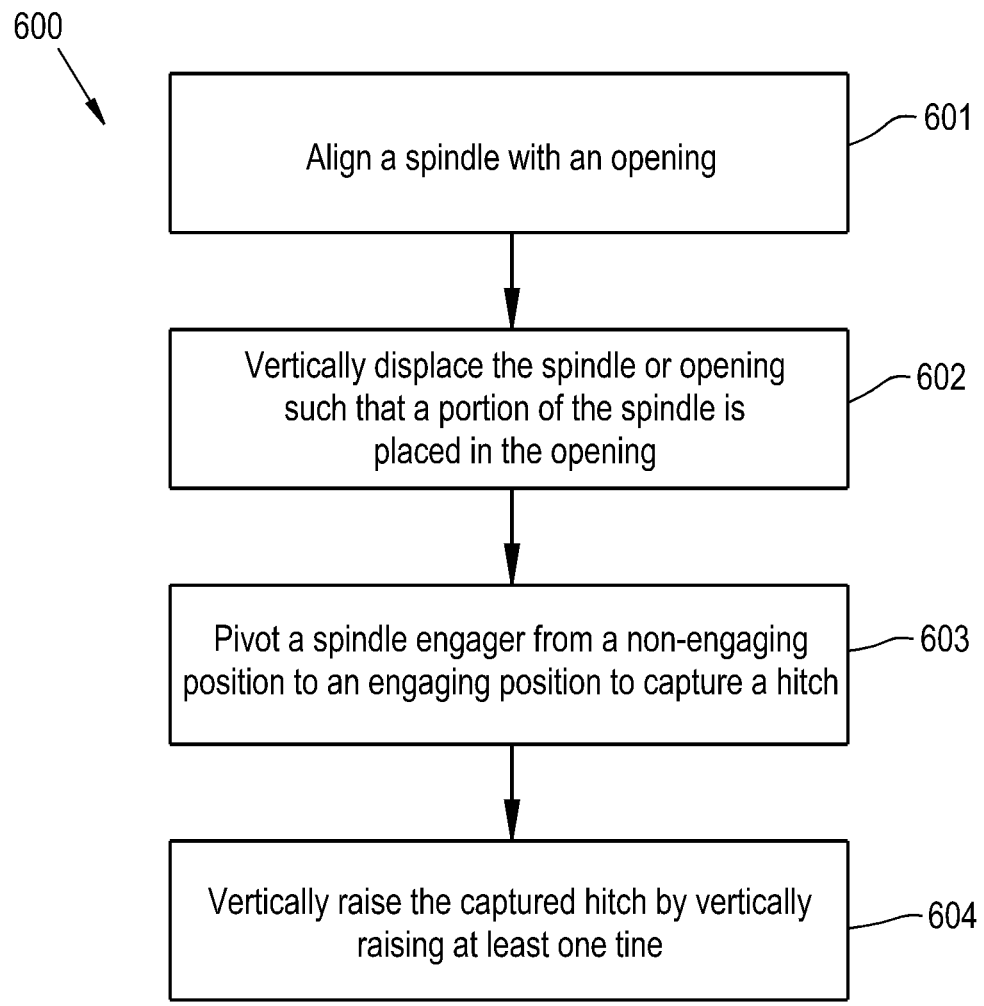
FIG. 6 is a flow chart illustrating an exemplary embodiment of a method of hitching a forklift to an implement in accordance with the present disclosure.

Referring now to FIG. 6, an exemplary embodiment of a method 600 of hitching a forklift, such as the forklift 100, to an implement is illustrated. The method 600 includes aligning 601 a generally vertical spindle 220 (or a spindle opening 520) carried by one or more tines 111 of the forklift 100 with a hitch opening 711 (or a hitch spindle 712) of a hitch 710 of an implement 700, which is first illustrated in FIG. 7. The tine(s) 111 is vertically displaced 602 to vertically displace the spindle 220 (or spindle opening 520) such that a portion of the spindle 220 (or hitch spindle 712) is placed within the hitch opening 711 (or spindle opening 520). Once the portion of the spindle 220, 712 is placed within the corresponding opening 520, 711, the spindle engager 240 is pivoted 603 from a non-engaging position, which is first illustrated in FIG. 7, to the engaging position, which is illustrated, for example, in FIGS. 1-3, to capture the hitch 710 so the forklift 100 may tow the implement 700. In some embodiments, the method 600 further includes vertically raising 704 the captured hitch 710 by vertically raising the tine(s) 111 of the forklift 100. The method 600 is further described herein with reference to FIGS. 7-11.

Figure 7:
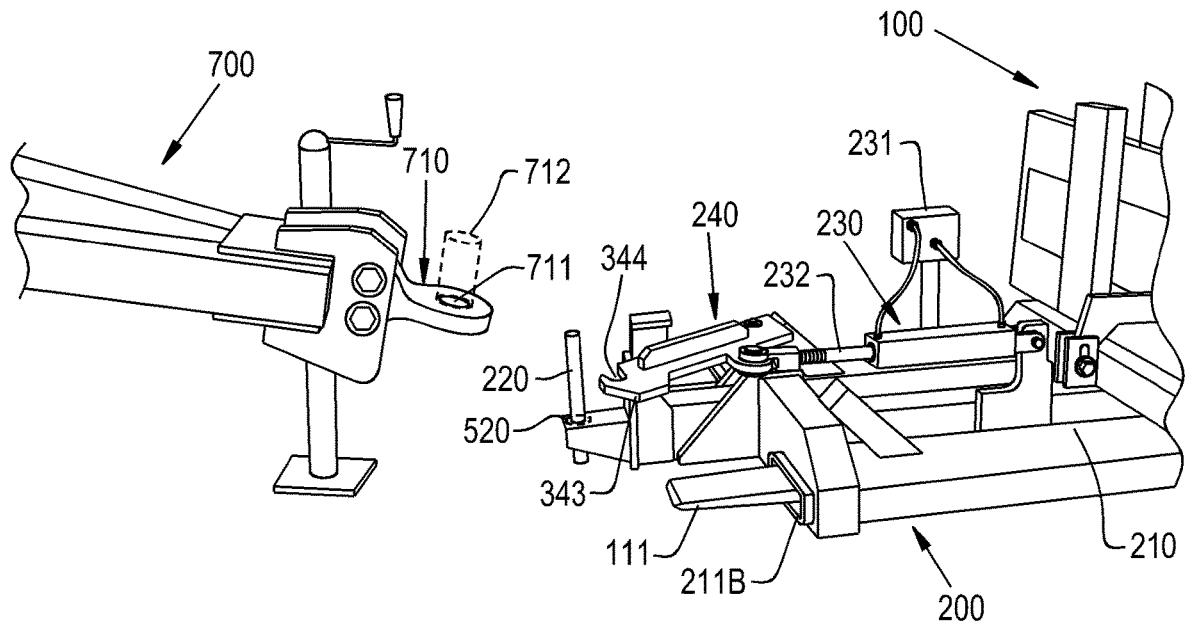
FIG. 7 is a perspective view of the forklift illustrated in FIGS. 1-4 approaching an implement having a hitch with the spindle engager of the hitch interfacing system in a non-engaging position.

Referring specifically now to FIG. 7, the forklift 100 is illustrated carrying the hitch interfacing system 200 on the tines 111 of the forklift 100 by placing the tines 111 in the channels 211A, 211B of the frame 210. As illustrated, the spindle engager 240 is in a non-engaging position where the hook 343 and the engagement channel 344 are not engaging/contacting the spindle 220. The spindle 220 is near an implement 700 having a hitch 710 with a hitch opening 711 formed therein that has a greater radius than the spindle 220, allowing the spindle 220 to be placed within the hitch opening 711. In certain situations, the hitch 710 may be provided with a hitch spindle 712, illustrated in dashed lines, rather than the hitch opening 711. When the hitch 710 is provided with a hitch spindle 712, the alternative embodiment of the hitch interfacing system 500 with the spindle opening 520 may be utilized to capture the hitch 710, as will be appreciated from the further description provided herein.

Figure 8:
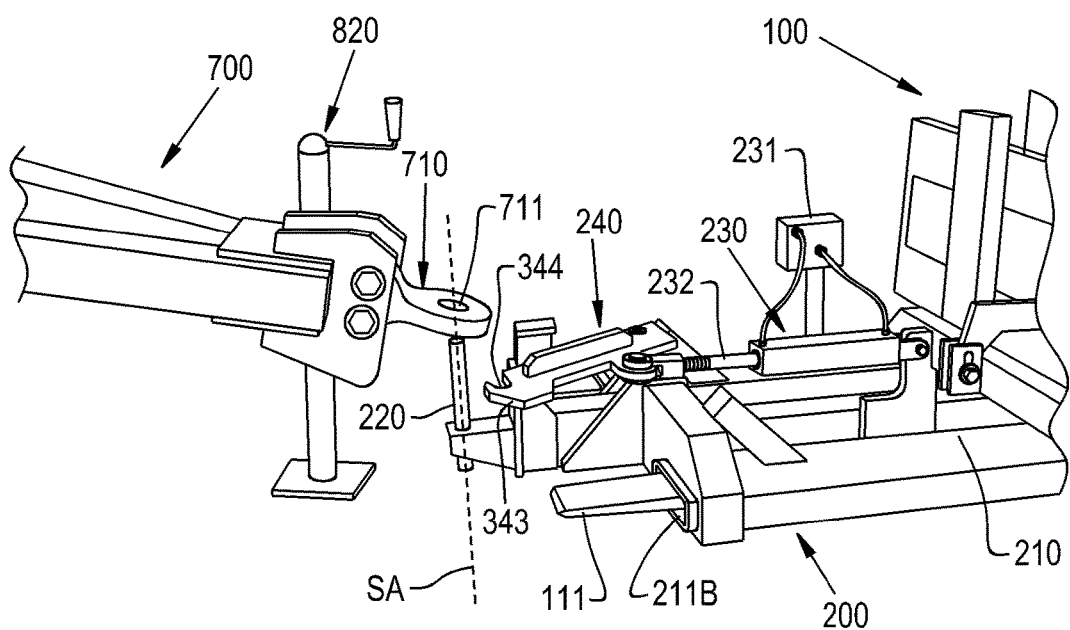
FIG. 8 is a perspective view of the forklift illustrated in FIG. 7 after the spindle of the hitch interfacing system has been moved into alignment with a hitch opening of the hitch of the implement.

Referring now to FIG. 8, the forklift 100 has been moved such that the spindle 220 is aligned with the hitch opening 711, i.e., the spindle axis SA extends through the hitch opening 711. While the entire forklift 100 is illustrated as moving to align the spindle 220 with the hitch opening 711, it should be appreciated that the alignment may be due to, for example, movement of the tines 111 only without moving the wheels 102 of the forklift 100. When the hitch interfacing system 500 is utilized, the forklift 100 is driven such that a spindle axis defined by the hitch spindle 712 extends through the spindle opening 520. In some embodiments, a jack 820 of the implement 700 may be utilized prior to aligning the spindle 220 with the hitch opening 711 so the hitch opening 711 is vertically raised relative to the spindle 220.

Figure 9:
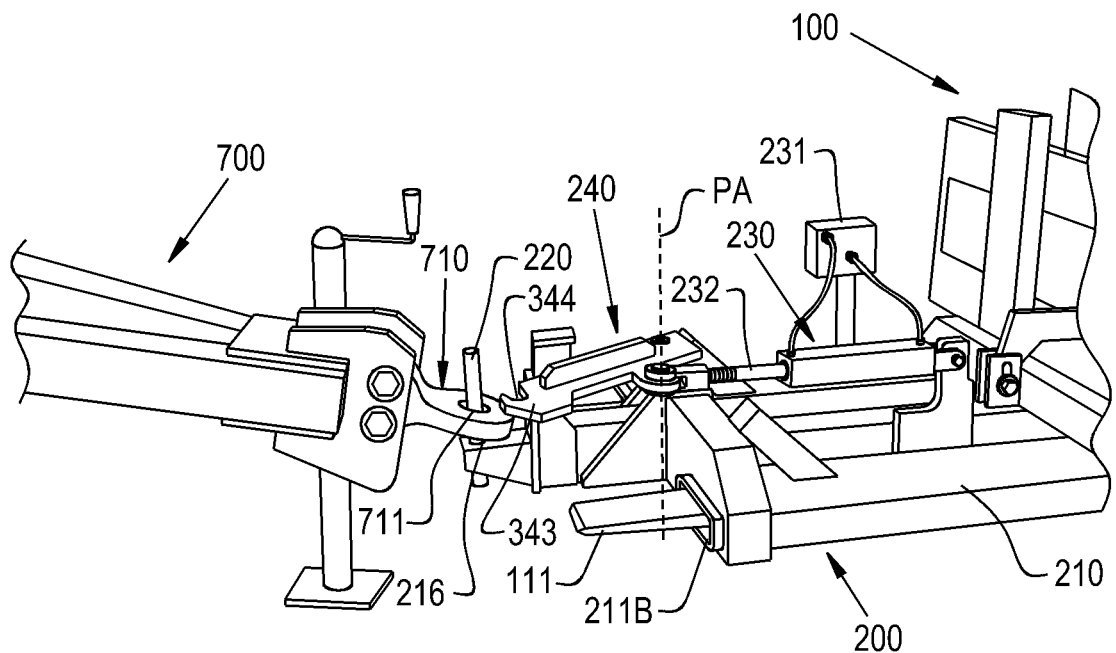
FIG. 9 is a perspective view of the forklift illustrated in FIGS. 7-8 after the spindle of the hitch interfacing system has been vertically displaced so a portion of the spindle is placed within the hitch opening of the hitch.

Referring now to FIG. 9, the aligned spindle 220 has been vertically displaced by vertically displacing the tines 111 of the forklift 100 to lift the hitch interfacing system 200 such that a portion of the spindle 220 is placed within the hitch opening 711. When the hitch interfacing system 500 is provided on the forklift 100 instead, the spindle opening 520 is vertically displaced so a portion of the hitch spindle 712 is placed within the spindle opening 520. When the spindle 220 is raised such that it is placed within the hitch opening 711, the base 216 may contact the hitch 710, allowing further raising of the tines 111 to also raise the hitch 710. However, when the spindle engager 240 is in the non-engaging position, as illustrated in FIG. 9, the hitch 710 is free to vertically shift away from the base 216, e.g., while traveling over uneven terrain with bumps, and come off the spindle 220.

Figure 10:
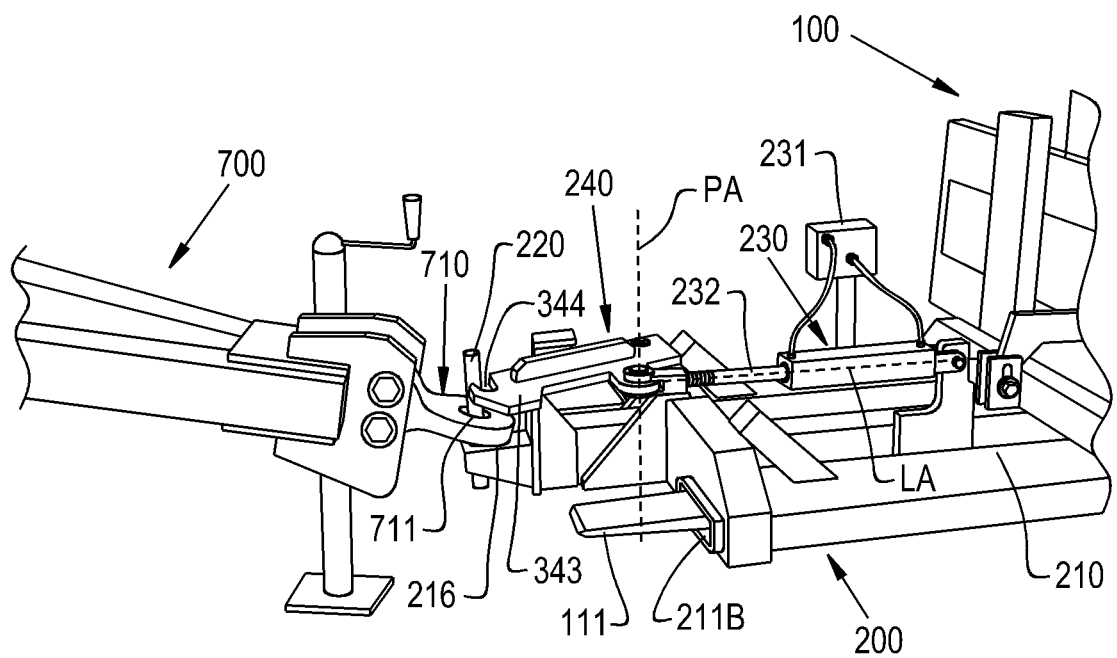
FIG. 10 is a perspective view of the forklift illustrated in FIGS. 7-9 as the spindle engager is pivoting to the engaging position from the non-engaging position while a portion of the spindle is placed within the hitch opening of the hitch.
Figure 11:
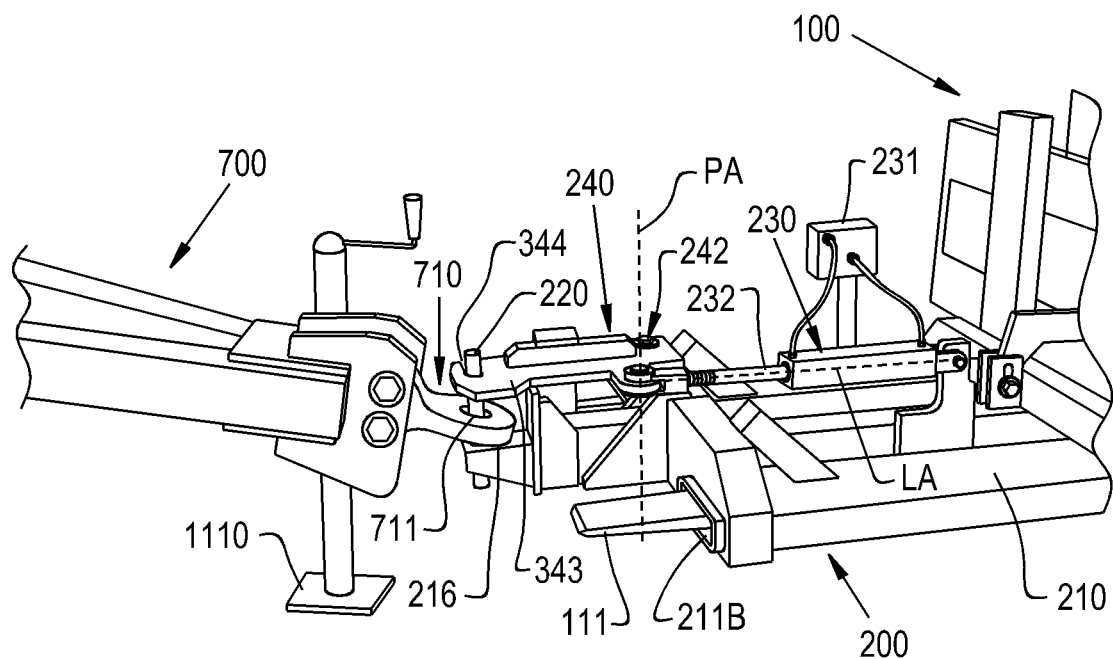
FIG. 11 is a perspective view of the forklift illustrated in FIGS. 7-10 with the spindle engager in the engaging position to engage the spindle and capture the hitch.

To capture the hitch 710 so the hitch 710 is unlikely to come off the spindle 220, and referring now to FIGS. 10-11, the actuator 230 is activated to pivot the spindle engager 240 about the pivot axis PA from the non-engaging position, illustrated in FIGS. 7-8, to the engaging position where the spindle engager 240 engages the spindle, whether it be the spindle 220 or the hitch spindle 712. When the actuator 230 includes the actuator rod 232, an operator may utilize the control panel 130 in the operator cab 120 such that the controller 131 of the control panel 130 signals for the actuator 230 to linearly translate the actuator rod 232 along the longitudinal axis LA and pivot the hook 343 of the spindle engager 240 until the engagement channel 344 engages the spindle 220, as illustrated in FIG. 11. When the spindle engager 240 engages the spindle 220 to capture the hitch 710, as illustrated in FIG. 11, the hitch 710 is generally secured to the hitch interfacing system 200, and thus the forklift 100. The tines 111 may then be further raised to raise the hitch 710 and the implement 700 towed to a desired location by the forklift 100.

When it is desired to release the hitch 710 after towing, the tines 111 may first be lowered so a rest 1110 of the hitch 710 contacts the ground. The spindle engager 240 may then be pivoted to the non-engaging position and the spindle 220 vertically displaced (by displacing the tines 111) so the spindle 220 is no longer placed within the hitch opening 711. The forklift 100 may then be driven away to, for example, tow another implement or perform a different task. When it is desired to remove the hitch interfacing system 200 (or hitch interfacing system 500) from the forklift 100, the forklift 100 can be driven to a location where the system 200, 500 is to be stored and the tines 111 lowered so the system 200, 500 rests on the desired surface. The lock 410 may then be unfastened from the frame bar 421 and the forklift 100 driven away from the system 200, 500 so the tines 111 are no longer placed in the channels 212A, 212B and the forklift 100 is free for other uses.

From the foregoing, it should be appreciated that the present disclosure provides hitch interfacing systems 200, 500 and methods 600 for utilizing a forklift 100, or other utility vehicle, to tow large, heavy constructions with hitches, such as an agricultural implement 700. The systems 200, 500 may be easily installed and removed from the forklift 100 and easily interfaced to a hitch 710, allowing the forklift 100 to quickly and conveniently interface with an implement for towing. Thus, a utility vehicle that is not generally equipped to tow implements with hitches, such as the forklift 100, can be quickly equipped with the system 200, 500 to tow an implement with a hitch before quickly and conveniently disengaging the system 200, 500 from the forklift 100 to allow the forklift 100 to be used for other tasks, which eliminates the need for keeping a different vehicle, such as a tractor, on-site to tow implements with hitches.

While the previously described method 600 is described as being performed by an operator controlling functions of the forklift 100 via the control panel 130 and controller 131, some or all of the method 600 may be performed automatically by the controller 131. In some embodiments, the forklift 100 may be equipped with additional sensors and other elements to automatically perform the method 600 with little, if any, operator input.

It is to be understood that, in some embodiments, the steps of the method 600 are performed by the controller 131 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller 131 described herein, such as the method 600, is implemented in software code or instructions which are tangibly stored on a tangible computer readable medium. The controller 131 loads the software code or instructions via a direct interface with the computer readable medium or via a wired and/or wireless network. Upon loading and executing such software code or instructions by the controller 131, the controller 131 may perform any of the functionality of the controller 131 described herein, including any steps of the method 600 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler.

As used herein, the term "software code" or "code" also includes any human-understandable computer instructions or set of instructions, e.g., a script, that may be executed on the fly with the aid of an interpreter executed by a computer's central processing unit or by a controller.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A system for interfacing with a hitch of an implement or a towed vehicle, the system comprising:
    a longitudinal frame including at least one crossbar, the longitudinal frame comprising at least one channel that is shaped to accept a tine of a forklift, a vertically displaceable tine positioned therein;
    a spindle carried by the longitudinal frame;
    an actuator carried by the longitudinal frame; and
    a spindle engager carried by a portion of the longitudinal frame including the at least one crossbar, the spindle engager pivotably coupled to the portion of the longitudinal frame and operably linked to the actuator which is longitudinally aligned and parallel to the at least one channel, wherein the spindle engager comprises a pivotal end operably connected to the portion of the longitudinal frame and comprising at an opposite end a U-shaped hook that, when positioned in an engaged position with the spindle, surrounds only a portion of an outer circumference of the spindle, and the spindle engager is positioned in a parallel longitudinal alignment with a portion of the at least one channel when in the engager position, and wherein when the spindle engager is in a non-engaged position, the hook end of the spindle engager is positioned out of a parallel longitudinal alignment with the portion of the at least one channel, and the spindle is moved by the vertically displaceable tine into an opening in the hitch and the hook of the spindle engager engages the spindle to secure the spindle in the engaged position with the spindle engager.

2. The system of claim 1, wherein the actuator comprises an actuator rod linked to the spindle engager such that translation of the actuator rod pivots the spindle engager between the engaging position and the non-engaging position.

3. The system of claim 2, wherein the hook of the spindle engager comprises an engagement groove including the U-shape that is circumferentially aligned with the spindle about a pivot axis of the book.

4. The system of claim 1, wherein a spindle axis of the spindle forms a perpendicular angle relative to a ground plane of between 85 degrees and 90 degrees.

5. The system of claim 1, wherein the at least one channel of the frame comprises a plurality of channels.

6. The system of claim 1, wherein the frame defines a longitudinal axis and the spindle is carried adjacent to a longitudinal end of the frame.

7. The system of claim 6, wherein the at least one channel defines a length that extends parallel to the longitudinal axis of the frame.

8. A forklift for transporting implements or other vehicles, comprising:
   a chassis;
   at least one vertically displaceable tine carried by the chassis; and
   a hitch interfacing system, comprising:
      a longitudinal frame including at least one crossbar, the longitudinal frame comprising at least one channel with the at least one vertically displaceable tine placed therein;
      a spindle carried by the longitudinal frame;
      an actuator carried by the longitudinal frame; and
      a spindle engager carried by a portion of the longitudinal frame including the at least one crossbar, the spindle engager pivotably coupled to the portion of the longitudinal frame and operably linked to the actuator which is longitudinally aligned and parallel to the at least one channel, wherein the spindle engager comprises a pivotal end operably connected to the portion of the longitudinal frame and comprising at an opposite end a U-shaped hook that, when positioned in an engaged position with the spindle, surrounds only a portion of an outer circumference of the spindle, and the spindle engager is positioned in a parallel longitudinal alignment with a portion of the at least one channel when in the engager position, and wherein when the spindle engager is in a non-engaged position, the hook end of the spindle engager is positioned out of a parallel longitudinal alignment with the portion of the at least one channel, and the spindle is moved by the vertically displaceable tine into an opening in the hitch and the hook of the spindle engager engages the spindle to secure the spindle in the engaged position with the spindle engager.

9. The forklift of claim 8, wherein the actuator comprises an actuator rod linked to the spindle engager much that translation of the actuator rod pivots the spindle engager between the engaging position and the non-engaging position.

10. The forklift of claim 9, wherein the hook of the spindle engager an engagement groove including a U-shape that is circumferentially aligned with the spindle about a pivot axis of the hook.

11. The forklift of claim 8, wherein a spindle axis of the spindle is forms a perpendicular angle relative to a ground plane of between 85 degrees and 90 degrees.

12. The forklift of claim 8, wherein the at least one tine comprises a plurality of tines and the at least one channel of the frame comprises a plurality of channels, each of the plurality of tines being placed in a respective one of the plurality of channels.

13. The forklift of claim 8, wherein the frame defines a longitudinal axis and the spindle is carried adjacent to a longitudinal end of the frame.

14. The forklift of claim 13, wherein the at least one channel defines a length that extends parallel to the longitudinal axis of the frame.

15. The forklift of claim 8, further comprising a controller operatively coupled to the actuator and configured to activate the actuator to pivot the spindle engager between the non-engaging position and the engaging position.

16. A method of hitching a forklift to an implement or a vehicle, the method comprising:
   aligning a spindle carried by the forklift with a hitch opening of a hitch;
   vertically displacing at least one tine of the forklift to vertically displace the spindle such that a portion of the spindle is placed within the hitch opening; and
   pivoting a spindle engager pivotally linked to an actuator and carried by a portion of a longitudinal frame including at least one crossbar of the forklift, the spindle engager including a pivotal end operably connected to the portion of the longitudinal frame and an opposite end having a U-shaped hook, the hook pivoting to contact the spindle and engage only a portion of an outer circumference of the spindle when the spindle engager is moved into an engaged position, the spindle engager only moving into a parallel longitudinal alignment with the longitudinal frame when in the engaged position.

17. The method of claim 16, wherein the pivoting comprises activating an actuator to pivot the spindle engager about a pivot axis from the non-engaging position to the engaging position.

18. The method of claim 17, wherein the hook comprising an engagement groove including a U-shape.

19. The method of claim 17, wherein the spindle defines a spindle axis that is parallel with the pivot axis, and wherein the spindle axis of the spindle form a perpendicular angle relative to a ground plane of between 85 degrees and 90 degrees.

20. The method of claim 16, further comprising vertically raising the captured hitch by vertically raising the at least one tine of the forklift.

* * * * *